(12) United States Patent
Kurkijärvi et al.

(10) Patent No.: US 11,969,689 B2
(45) Date of Patent: Apr. 30, 2024

(54) METHOD FOR PROCESSING PLASTIC WASTE PYROLYSIS GAS

(71) Applicant: Neste Oyj, Espoo (FI)

(72) Inventors: Antti Kurkijärvi, Porvoo (FI); Hannu Lehtinen, Porvoo (FI); Esa Korhonen, Porvoo (FI); Mikko Matilainen, Porvoo (FI); Max Nyström, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 17/596,354

(22) PCT Filed: Jun. 1, 2020

(86) PCT No.: PCT/FI2020/050370
§ 371 (c)(1),
(2) Date: Dec. 8, 2021

(87) PCT Pub. No.: WO2020/249854
PCT Pub. Date: Dec. 17, 2020

(65) Prior Publication Data
US 2023/0042698 A1    Feb. 9, 2023

(30) Foreign Application Priority Data

Jun. 10, 2019    (FI) ..................... 20195493

(51) Int. Cl.
*C10G 5/06* (2006.01)
*B01D 3/00* (2006.01)
*B01D 5/00* (2006.01)
*B01D 53/00* (2006.01)
*C10G 1/10* (2006.01)
(Continued)

(52) U.S. Cl.
CPC ............ *B01D 53/002* (2013.01); *B01D 3/00* (2013.01); *B01D 5/0036* (2013.01); *C10G 1/10* (2013.01); *C10G 5/06* (2013.01); *C10G 70/06* (2013.01); *C10G 75/00* (2013.01); *B01D 2257/70* (2013.01); *B01D 2258/0291* (2013.01); *C10B 53/07* (2013.01); *C10G 2300/1003* (2013.01)

(58) Field of Classification Search
CPC . C10G 1/10; C10G 5/06; C10G 70/06; C10G 75/00
See application file for complete search history.

(56) References Cited

U.S. PATENT DOCUMENTS 3,663,645 A    5/1972    Dorn et al.
4,591,366 A    5/1986    Wohner et al.
(Continued)

FOREIGN PATENT DOCUMENTS

CN    1122609 A    5/1996
CN    1225663 A    8/1999
(Continued)

OTHER PUBLICATIONS

Office Action dated Jun. 7, 2022, by the U.S. Patent and Trademark Office in U.S. Appl. No. 17/596,358.
(Continued)

*Primary Examiner* — Renee Robinson
(74) *Attorney, Agent, or Firm* — BUCHANAN INGERSOLL & ROONEY PC

(57) ABSTRACT

The present disclosure relates to methods for processing plastic waste pyrolysis gas, such as methods wherein clogging of the systems used in the method is avoided or at least alleviated.

5 Claims, 1 Drawing Sheet

(51) Int. Cl.
   *C10G 70/06*     (2006.01)
   *C10G 75/00*     (2006.01)
   *C10B 53/07*     (2006.01)

(56) References Cited

U.S. PATENT DOCUMENTS

| | | |
|---|---|---|
| 5,092,981 A | 3/1992 | Russo |
| 5,324,486 A | 6/1994 | Russo |
| 5,607,487 A | 3/1997 | Taylor |
| 5,917,138 A | 6/1999 | Taylor |
| 5,922,092 A | 7/1999 | Taylor |
| 7,905,990 B2 | 3/2011 | Freel |
| 8,961,743 B2 | 2/2015 | Freel |
| 9,045,695 B2 | 6/2015 | Brentnall et al. |
| 9,631,145 B2 | 4/2017 | Freel |
| 10,294,433 B2 | 5/2019 | Grainger et al. |
| 10,544,368 B2 | 1/2020 | Freel |
| 11,142,722 B2 | 10/2021 | Malm |
| 2003/0047437 A1 | 3/2003 | Stankevitch |
| 2009/0139851 A1 | 6/2009 | Freel |
| 2010/0282587 A1 | 11/2010 | Brentnall et al. |
| 2011/0083953 A1 | 4/2011 | Horn et al. |
| 2011/0123407 A1 | 5/2011 | Freel |
| 2015/0191656 A1 | 7/2015 | Freel |
| 2016/0369191 A1 | 12/2016 | Ward et al. |
| 2018/0030356 A1 | 2/2018 | Freel |
| 2018/0100108 A1 | 4/2018 | Grainger et al. |
| 2019/0161683 A1 | 5/2019 | Narayanaswamy et al. |
| 2019/0177626 A1 | 6/2019 | Ramamurthy et al. |
| 2019/0275486 A1 | 9/2019 | Peltekis et al. |
| 2020/0190406 A1 | 6/2020 | Freel |
| 2022/0226765 A1 | 7/2022 | Kurkijärvi et al. |

FOREIGN PATENT DOCUMENTS

| | | |
|---|---|---|
| CN | 205832665 U | 12/2016 |
| CN | 109603376 A | 4/2019 |
| EP | 0025100 A1 | 3/1981 |
| EP | 3031881 A1 | 6/2016 |
| JP | S4952172 A | 5/1974 |
| JP | 07-216363 A | 8/1995 |
| JP | 2000-212574 A | 8/2000 |
| JP | 2005134079 A | 5/2005 |
| JP | 2006321851 A | 11/2006 |
| JP | 2016060800 A | 4/2016 |
| WO | 2014145212 A2 | 9/2014 |
| WO | 2016077695 A1 | 5/2016 |

OTHER PUBLICATIONS

Finnish Search Report issued in corresponding Patent Application No. 20195493 dated Sep. 23, 2019.
International Preliminary Report on Patentability (PCT/IPEA/409) dated Apr. 28, 2021, by the Finnish Patent Office for International Application No. PCT/FI2020/050370.
International Search Report (PCT/ISA/210) and Written Opinion (PCT/ISA/237) dated Sep. 23, 2020, by the Finnish Patent Office as the International Searching Authority for International Application No. PCT/FI2020/050370.
International Search Report (PCT/ISA/210) and Written Opinion (PCT/ISA/237) dated Aug. 31, 2020, by the Finnish Patent Office as the International Searching Authority for International Application No. PCT/FI2020/050369.
Williams et al., "Analysis of products from the pyrolysis and liquefaction of single plastics and waste plastic mixtures", Resources, Conservation and Recycling, 51, 2007, pp. 754-769.
Williams et al., "Interaction of Plastics in Mixed-Plastic Pyrolysis", Energy & Fuels, vol. 13, No. 1, 1999, pp. 188-196.
Search Report dated Feb. 24, 2022 by the Chinese Patent Office for Application No. 2020800400510 (2 pages).
Search Report dated Mar. 1, 2022 by the Chinese Patent Office for Application No. 2020800398953 (2 pages).
Supplementary Search Report dated Apr. 5, 2022 by the European Patent Office for Application No. 20822580 (2 pages).
Supplementary Search Report dated Apr. 8, 2022 by the European Patent Office for Application No. 20822331 (2 pages).

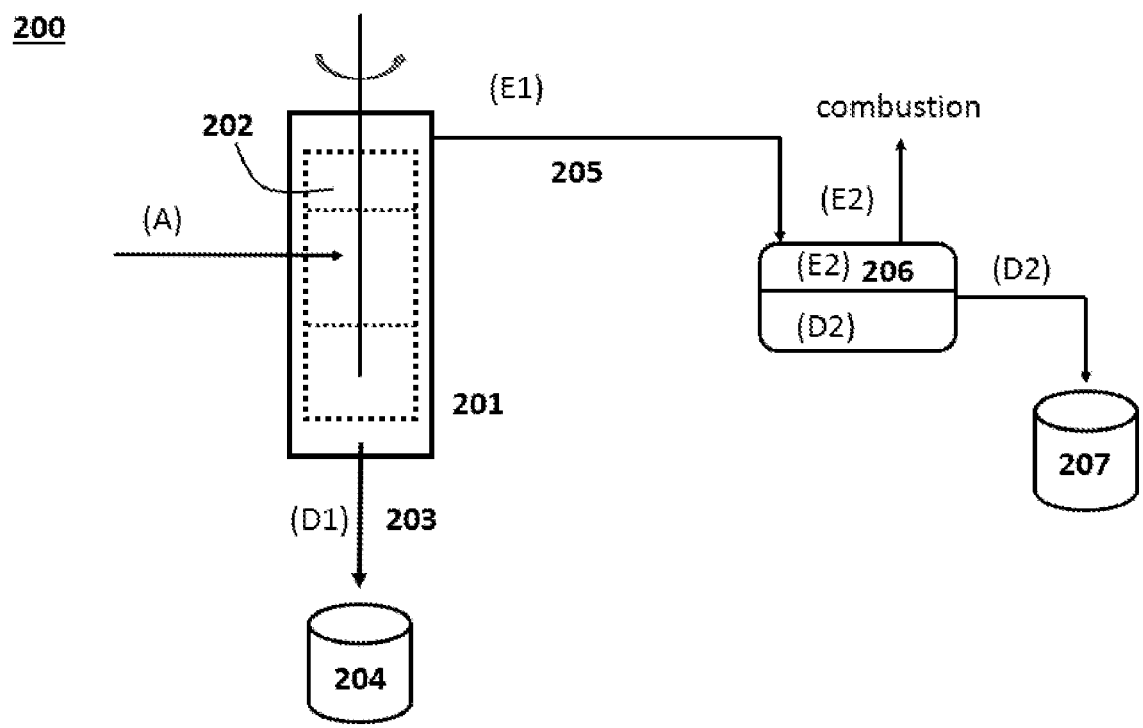

METHOD FOR PROCESSING PLASTIC WASTE PYROLYSIS GAS

FIELD

The present invention relates to methods for processing plastic waste pyrolysis gas, in particular methods wherein clogging of the systems used in the method is avoided.

BACKGROUND

Significant amount of waste plastic is produced around the world. For example municipal solid plastic waste comprises typically high-density polyethylene (HDPE), low-density polyethylene (LDPE), polypropylene (PP), polystyrene (PS), poly(vinyl chloride) (PVC), and poly(ethylene terephthalate) (PET). This is an abundant feedstock which could be utilized as an alternative refinery feed and a platform to new plastics and chemicals. However, solid plastic is not suitable feedstock as such, but it needs to be liquefied first. Yield and composition of the products are mainly influenced by plastic type and process conditions (Williams et al. Energy & Fuels, 1999, 13, 188-196).

Processing of waste plastic is carried out in chemical recycling systems, and it relies on thermal, pyrolytic reactions to crack the long plastic polymers to shorter products, most of which are liquids. The gaseous product mixture from plastic pyrolysis is known to clog and foul surfaces, pipes and equipment. Partly this is because some of the reaction products are heavy, waxy components which deposit on surfaces, but also tar, char and more solid, coke type deposits are common. The waxy components and tar are especially problematic on cooling surfaces of heat exchangers used in condensing the reaction mixture, but coke can deposit anywhere in the equipment. These cause two main problems. Firstly, the deposits act as an insulator reducing the heat transfer in the heat exchangers. Secondly, the deposits will eventually clog the heat exchanger, preventing any flow through it. Therefore, if traditional heat exchangers are used to condense the pyrolysis gas, then the equipment needs to be duplicated: while one is in operation, the other is under maintenance and cleaning. This is expensive and labor intensive.

This problem has been solved before using direct contact condensers. However, spray condensers, for example, suffer from relatively low separation efficiency, and they offer no protection against coke deposits. Also, the liquid recycling used in these condensers necessitates a liquid holdup which has two main drawbacks. Firstly, it significantly increases the fire load of the apparatus as there is a reservoir of hot pyrolysis product mixture in the recycle loop. Secondly, the relatively long residence time of this liquid reservoir exposes the liquid to additional thermal reactions, potentially reducing the product quality and causing fouling of the equipment.

Accordingly, there is still need for further methods for processing plastic waste pyrolysis gas wherein risk of clogging of the system used in the process is reduced.

SUMMARY

The following presents a simplified summary in order to provide a basic understanding of some aspects of various embodiments of the invention. The summary is not an extensive overview of the invention. It is neither intended to identify key nor critical elements of the invention, nor to delineate the scope of the invention. The following summary merely presents some concepts of the invention in a simplified form as a prelude to a more detailed description of exemplifying embodiments of the invention.

It was observed that when gaseous reaction mixture from plastic waste pyrolysis was admixed with cooled, condensed pyrolysis product, the highest boiling part of the pyrolysis gases condense smoothly from the admixture without clogging.

It was also observed that clogging of the plastic waste pyrolysis products could be avoided by passing the gaseous pyrolysis product to a condensing means operating at lower temperature than the pyrolysis temperature, when any solidifying materials is wiped and/or scraped from inner walls of the condensing means.

In accordance with the invention, there is provided a new method for processing plastic waste pyrolysis gas, the method comprising
  a) providing a plastic waste pyrolysis gas stream wherein temperature of the plastic waste pyrolysis gas stream is 300-650° C., preferably 450-500° C.,
  b) transferring the plastic waste pyrolysis gas stream to a condensing means, wherein temperature in the condensing means is 100-300° C., preferably 175-225° C. to produce a condensed fraction and a gaseous fraction of the plastic waste pyrolysis gas,
  c) continuously wiping and/or scraping inner surfaces of the condensing means,
  d) separating the gaseous fraction and the condensed fraction to yield a first liquid product stream and a gaseous product stream and
  e) transferring the first liquid stream to a collecting means via a line at temperature above 100° C., preferably between 150° C. and 250° C.

A number of exemplifying and non-limiting embodiments of the invention are described in accompanied dependent claims.

Various exemplifying and non-limiting embodiments of the invention and to methods of operation, together with additional objects and advantages thereof, are best understood from the following description of specific exemplifying embodiments when read in connection with the accompanying FIGURES.

The verbs "to comprise" and "to include" are used in this document as open limitations that neither exclude nor require the existence of also unrecited features. The features recited in depending claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The exemplifying and non-limiting embodiments of the invention and their advantages are explained in greater detail below with reference to the accompanying FIGURE, in which The FIGURE shows an exemplary non-limiting system suitable for processing plastic waste pyrolysis gas according to an embodiment of the present invention.

DESCRIPTION

The present invention is related to processing plastic waste pyrolysis gas such that clogging of a system used in the method is avoided or at least alleviated.

The FIGURE shows an exemplary system 100 suitable for use in a method according to an embodiment of the present invention. According to the embodiment shown in the FIGURE, a plastic waste pyrolysis gas stream (A) is transferred a condensing means 101. Temperature of the plastic waste pyrolysis gas stream is typically 300-650° C., preferably 450-500° C. Temperature of the condensing means is below the temperature of the plastic waste pyrolysis gas stream. Exemplary temperature of the condensing means is 100-300° C., preferably 175-225° C.

According to this embodiment the condensing means comprises wiping means and/or scraping means 102 adapted to wipe and/or scrape mechanically the inner surfaces of the condensing means 101. Exemplary suitable condensing means are wiped film condensers and scraped surface heat exchangers. These condensing means are basically jacketed tanks, with a rotor inside which continuously wipes, and scrapes any solidifying material from the walls of the condensing means. This prevents the formation of thick deposits on the condenser walls and thus prevents clogging of the apparatus.

The condensing means 101 is operating at temperature which is lower than the temperature of the plastic waste pyrolysis gas stream. Accordingly, the heaviest parts of the pyrolysis gas are condensed, and a heavy component depleted gaseous fraction is produced. Separation of the condensed fraction and the gaseous fraction yields the first liquid product stream (D1) and a gaseous product stream (E1).

The first liquid product stream (D1) i.e. the heavy fraction may be transferred via line 103 to a collecting means 104 as a heavy product. In order to avoid blockages, the line 203 is preferably kept at temperatures above 100° C. more preferably between 150° C. and 250° C. The desired temperature range can be obtained by insulating the line and/or using one or more heating means.

According to a preferable embodiment the gaseous product stream is directed via line 105 to a second condensing means 106. This condensing means is typically a traditional heat exchanger. According to an exemplary embodiment, temperature of the gaseous fraction is decreased in the condensing means 106 to 10-50° C., preferably 20-40° C. The cooling produces condensed liquid and non-condensable gases. No fouling or clogging is expected within the line 105 and in the condensing means 106 as the majority of the heavy components have been removed. After cooling, the condensed liquid is separated from the non-condensable gases (E2) to yield a second liquid product stream (D2). It can be transferred in a collecting means such as a tank 107 as a light product. The non-condensable gases may be directed to combustion or to one or more further collecting means. Yield and composition of the light product is dependent mainly on the nature of the waste plastic, the pyrolysis conditions and the condensing temperatures. The non-condensable gases may be directed to combustion or to one or more further collecting means.

Example 1

The process was simulated with Aspen plus software. The main part of the pyrolysis gas was modelled using pseudo components, and the light ends was modelled using real components. The pseudo components were estimated using experimentally measured distillation curve and density from crude plastics pyrolysis oil. The used density was 809.8 kg/m³, and true boiling point (TBP) distillation curve is presented in table 1.

TABLE 1

| Recovered mass (%) | Temperature (C. °) |
| --- | --- |
| 2 | 36.0 |
| 5 | 68.6 |
| 10 | 97.4 |
| 30 | 171.9 |
| 50 | 236.0 |
| 70 | 316.0 |
| 90 | 430.4 |
| 95 | 474.3 |
| 100 | 582.4 |

The amount and composition of light ends were estimated from literature (Williams et al., Energy & Fuels, 1999, 13, 188-196; Williams et al., Recources, Concervation and Recycling, 2007, 51, 754-769). Mass ratio of lights and pseudo components was 0.27, and the composition of the lights is presented in Table 2.

TABLE 2

| Component | wt-% |
| --- | --- |
| methane | 36.3 |
| ethene | 2.2 |
| ethane | 28.9 |
| propene | 4.7 |
| propane | 19.9 |
| butene | 1.5 |
| butane | 6.7 |

The thermodynamic model used in the simulations was Braun K-10, and it was assumed that there was one ideal separation stage in the condensing unit.

Stream of plastic waste pyrolysis gas, having a pressure of 95 kPa(a), a temperature of 500° C., and average molar weight of 69.2 g/mol and a mass flow of 20 kg/h exited the reactor. It was allowed to enter a scraped film condenser, which was cooled by cooling oil. The scraper kept the heat exchange surfaces clean, and a partial condensation of the gas occurred. The product was collected from the bottom of the vessel. The temperatures of the products from this heat exchanger were adjusted to be 200° C. by adjusting the cooling oil temperature. The heat transfer coefficient for the metallic heat exchanger wall was 176 kW/m²° C.

The results from the simulations are presented in Table 3.

TABLE 3

| Time (h) | Fouling (mm) | Pressure drop (kPa) | Heat transfer coefficient (kW/m²C.) | Product temperature (° C.) | LWP condensed (wt-%) |
| --- | --- | --- | --- | --- | --- |
| 0 | 0 | 0.09 | 176 | 200 | 41.6 |
| 5 | 0 | 0.09 | 176 | 200 | 41.6 |
| 15 | 0 | 0.09 | 176 | 200 | 41.6 |

Example 2

The process was simulated with Aspen plus software. The main part of the pyrolysis gas was modelled using pseudo components, and the light ends was modelled using real components. The pseudo components were estimated using experimentally measured distillation curve and density from crude plastics pyrolysis oil. The used density was 809.8 kg/m³, and true boiling point (TBP) distillation curve is presented in table 4.

TABLE 4

| Recovered mass (%) | Temperature (C. °) |
|---|---|
| 2 | 36.0 |
| 5 | 68.6 |
| 10 | 97.4 |
| 30 | 171.9 |
| 50 | 236.0 |
| 70 | 316.0 |
| 90 | 430.4 |
| 95 | 474.3 |
| 100 | 582.4 |

The amount and composition of light ends were estimated from literature (Williams et al., Energy & Fuels, 1999, 13, 188-196; Williams et al., Recources, Concervation and Recycling, 2007, 51, 754-769). Mass ratio of lights and pseudo components was 0.27, and the composition of the lights is presented in Table 5.

TABLE 5

| Component | wt-% |
|---|---|
| methane | 36.3 |
| ethene | 2.2 |
| ethane | 28.9 |
| propene | 4.7 |
| propane | 19.9 |
| butene | 1.5 |
| butane | 6.7 |

The thermodynamic model used in the simulations was Braun K-10, and it was assumed that there was one ideal separation stage in the condensing unit.

Stream of plastic waste pyrolysis gas, having a pressure of 95 kPa(a), a temperature of 500° C., and average molar weight of 69.2 g/mol and a mass flow of 20 kg/h exited the reactor. It was allowed to enter a cooling oil cooled scraped film condenser, with the scraping turned off. This resulted in partial condensation and the liquid product was collected from the bottom of the vessel. As the condensed products attached to the heat exchanging surfaces were not continuously scraped off, a deposit build-up on the walls resulted.

The temperatures of the products from this heat exchanger were adjusted by the cooling oil temperature to be initially 200° C. However, as the deposit build up, the heat transfer decreased and less condensation occurred. This decreased the amount of condensed product. Fouling rate of 1 mm/h was assumed and the heat transfer coefficients for the metallic heat exchanger wall and the fouling layer were 176 kW/m$^{2}$° C. and 0.083 kW/m$^{2}$° C., respectively.

The results from the simulations are presented in Table 6.

TABLE 6

| Time (h) | Fouling (mm) | Pressure drop (kPa) | Heat transfer coefficient (kW/m$^2$C.) | Product temperature (° C.) | LWP condensed (wt-%) |
|---|---|---|---|---|---|
| 0 | 0 | 0.09 | 176.0 | 200.0 | 41.6 |
| 0.5 | 0.5 | 0.09 | 85.6 | 234.3 | 36.8 |
| 1 | 1 | 0.09 | 56.6 | 272.2 | 31.6 |
| 2.5 | 2.5 | 0.10 | 28.0 | 347.0 | 21.2 |
| 5 | 5 | 0.13 | 15.2 | 402.8 | 13.5 |
| 10 | 10 | 0.28 | 8.0 | 444.1 | 7.7 |

As can be seen from Table 3, the performance of the heat exchanger remains unchanged over time, when the heat exchange surfaces are kept clean using scraping. On the other hand, it can be observed from Table 6 that the fouling has a significant effect on the performance of the heat exchanger if the fouled layer is left untouched.

The specific examples provided in the description given above should not be construed as limiting the scope and/or the applicability of the appended claims.

What is claimed is:

1. A method for processing plastic waste pyrolysis gas, the method comprising:
    a) providing a plastic waste pyrolysis gas stream wherein a temperature of the plastic waste pyrolysis gas stream is 300-500° C.;
    b) transferring the plastic waste pyrolysis gas stream directly obtained from pyrolysis to a condensing means, wherein a temperature in the condensing means is 100-300° C.;
    c) continuously wiping and/or scraping solidifying material from inner surfaces of the condensing means with a rotor to obtain a condensed fraction comprising waxy components including tar, char and solids, and a gaseous fraction;
    d) collecting the condensed fraction by
        transferring the condensed fraction to a first collecting means via a line at a temperature of 150-250° C. to yield a heavy product; and
        condensing the gaseous fraction to produce a condensed liquid and non-condensable gases; separating the condensed liquid from the non-condensable gases and collecting the condensed liquid to yield a light product, wherein the step of condensing the gaseous fraction to produce the condensed liquid and non-condensable gases is conducted in a heat exchanger wherein the heat exchanger does not contain any wiping means or scraping means adapted to mechanically wipe or scrape inner surfaces of the heat exchanger.

2. The method according to claim 1, wherein the temperature of the plastic waste pyrolysis gas stream is 450-500° C.

3. The method according to claim 1, wherein the temperature in the condensing means is 175-225° C. to produce the condensed fraction and the gaseous fraction of the plastic waste pyrolysis gas.

4. The method according to claim 1, wherein the condensing the gaseous fraction of step d) includes cooling to 10-50° C.

5. The method according to claim 1, wherein in step b), the temperature in the condensing means is 100-200° C.

\* \* \* \* \*